US 6,605,657 B1

United States Patent
Favis et al.

(10) Patent No.: US 6,605,657 B1
(45) Date of Patent: Aug. 12, 2003

(54) POLYMER COMPOSITIONS CONTAINING THERMOPLASTIC STARCH

(75) Inventors: Basil D. Favis, Kirkland (CA); Francisco Rodriguez, Montreal (CA); Bruce A. Ramsay, Harrowsmith (CA)

(73) Assignee: Polyvalor Societe en Commandite, Quebec (CA)

( * ) Notice: Subject to any disclaimer, the term of this patent is extended or adjusted under 35 U.S.C. 154(b) by 0 days.

(21) Appl. No.: 09/472,242

(22) Filed: Dec. 27, 1999

(51) Int. Cl.$^7$ ................................................ C08L 1/00
(52) U.S. Cl. ........................ 524/52; 524/53; 524/388
(58) Field of Search ........................... 524/47, 51, 52, 524/53, 388

(56) References Cited

U.S. PATENT DOCUMENTS

| 5,095,054 A | 3/1992 | Lay et al. | |
| 5,462,983 A | * 10/1995 | Bloembergen | 524/51 |
| 6,191,196 B1 | * 2/2001 | Willett | 524/13 |

FOREIGN PATENT DOCUMENTS

| EP | 0 327 505 | 8/1989 |
| EP | 0 554 939 | 8/1993 |
| WO | WO90/14388 | 11/1990 |

OTHER PUBLICATIONS

Otey et al., "Starch-Based Blown Films", *Ind. Eng. Chem. Prod. Res. Dev.*, 19:592–595 (1980).
St-Pierre et al., "Processing and characterization of thermoplastic starch/polyethylene blends", *Polymer*, 38/3:647–655 (1997).

* cited by examiner

Primary Examiner—Christopher Henderson
(74) Attorney, Agent, or Firm—Jeffrey S. Melcher; Manelli Denison & Selter, PLLC

(57) ABSTRACT

There is provided a method of preparing a thermoplastic starch and synthetic polymer blend, said method comprising the steps of:

(a) providing a starch suspension comprising starch, water and a plasticizer, preferably glycerol; (b) obtaining a thermoplastic starch from the starch suspension by causing gelatinization and plasticization of said starch suspension by exerting heat and pressure on said starch suspension in a first extrusion unit; (c) evaporating and venting off residual water from said thermoplastic starch to obtain a substantially moisture-free thermoplastic starch; (d) obtaining a melt of a synthetic polymer or polymer blend in a second extrusion unit; and (e) combining the melt obtained from step (d) with the substantially moisture-free thermoplastic starch. Also provided are compositions of matter comprising immiscible blends of thermoplastic starches, polymers, and compatibilizers.

20 Claims, 10 Drawing Sheets

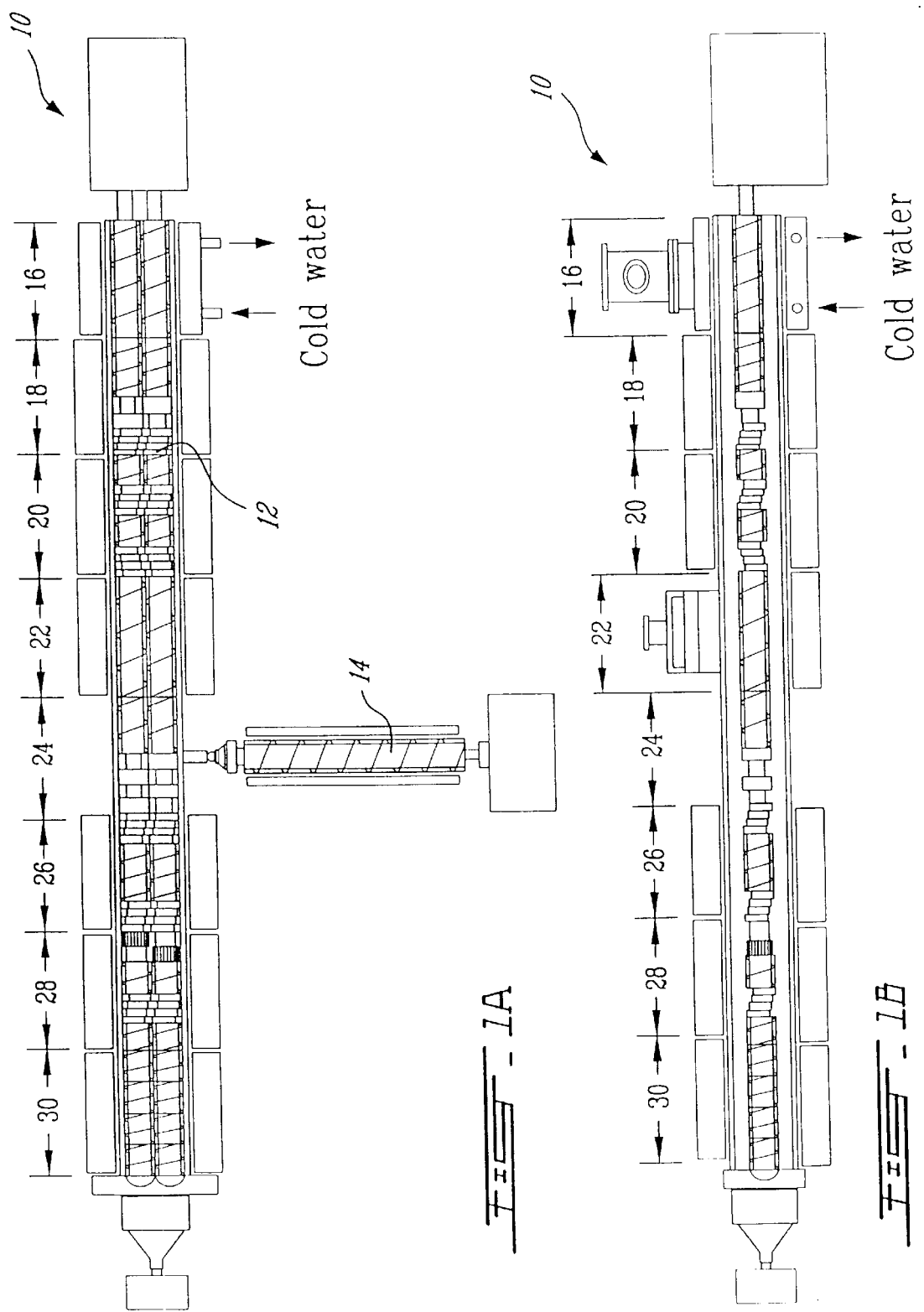

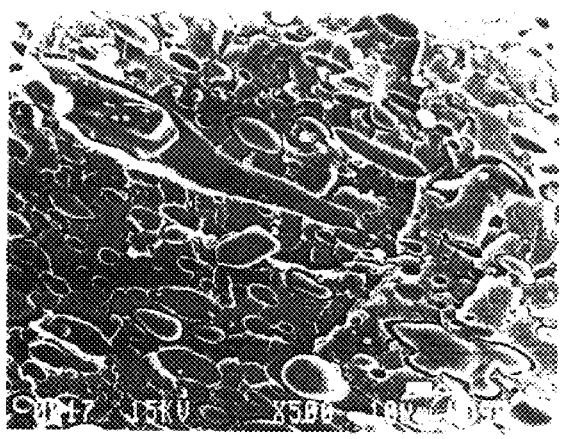
FIG. 2A
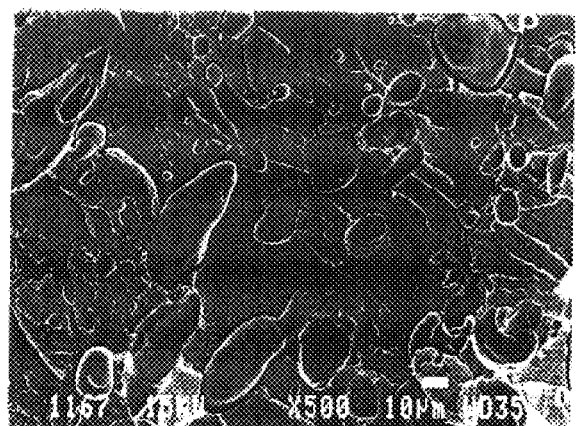
FIG. 2B
FIG. 2C
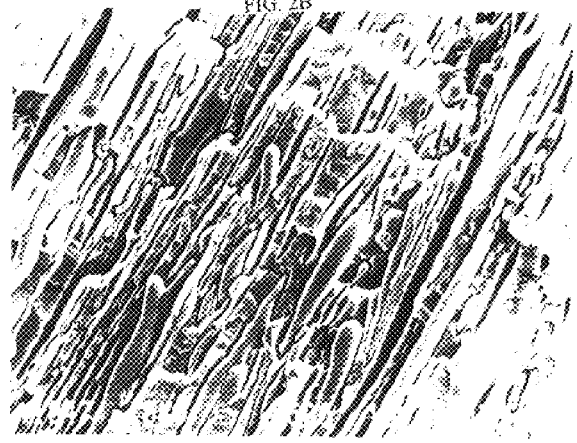
FIG. 2D

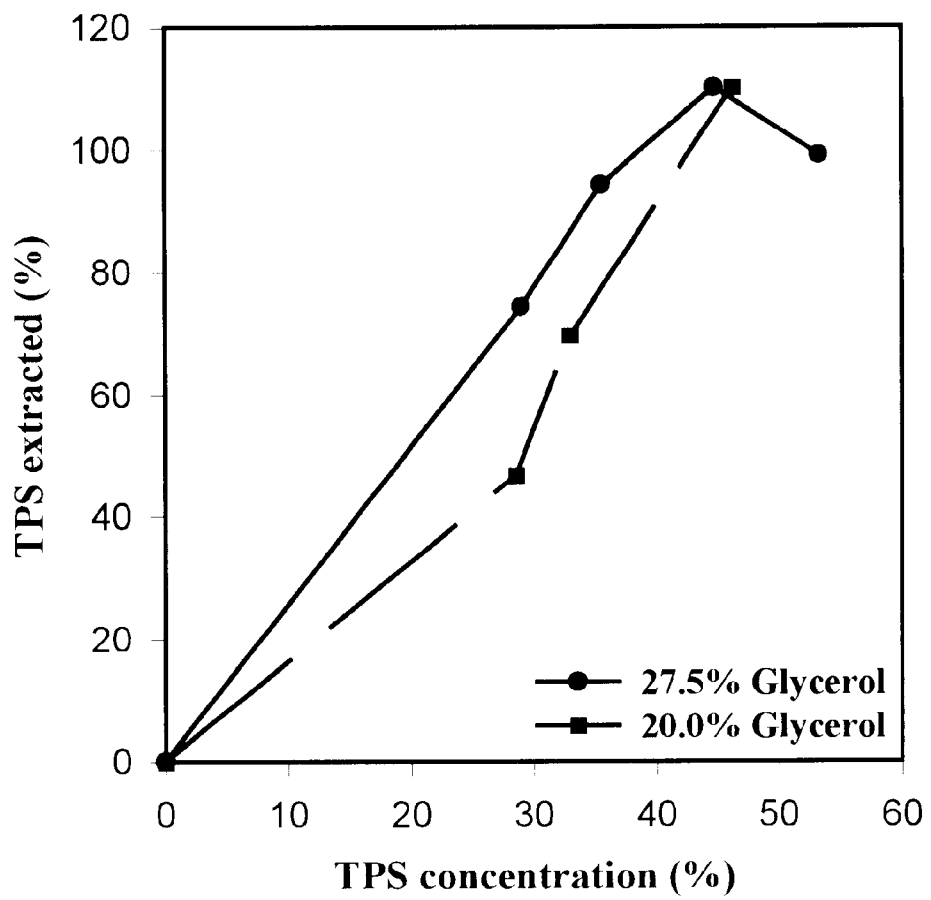
Figure 5. Accessibility of starch domains in LDPE/TPS blends after 96 hours of extraction a)
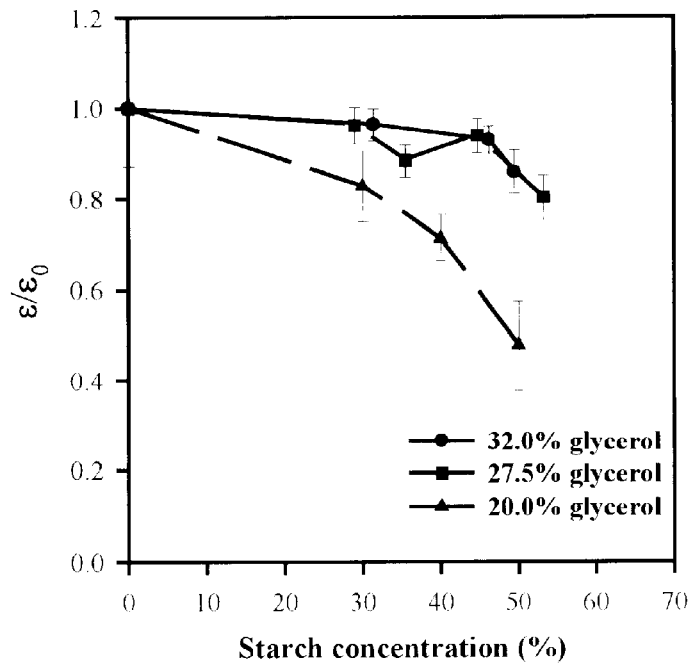
b)
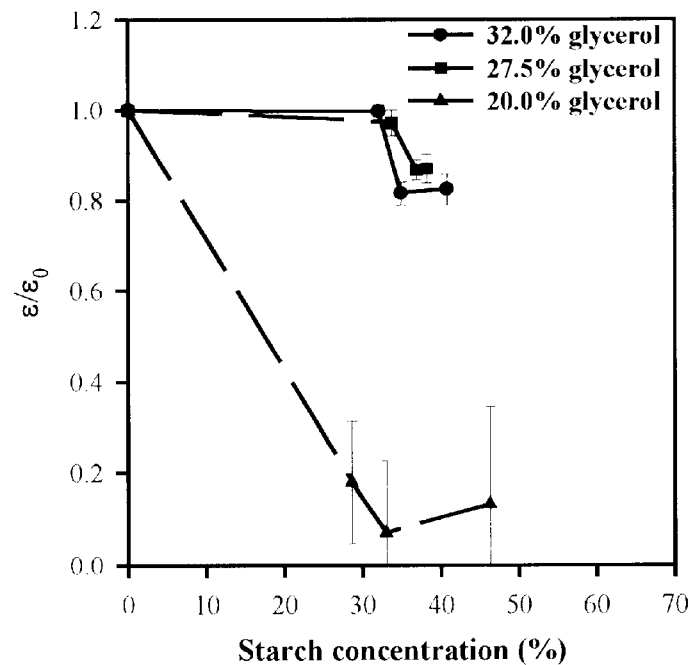
Figure 6. Relative elongation at break ($\varepsilon/\varepsilon_0$) of LDPE/TPS blends:
a) LDPE2040, b) LDPE2049 a)
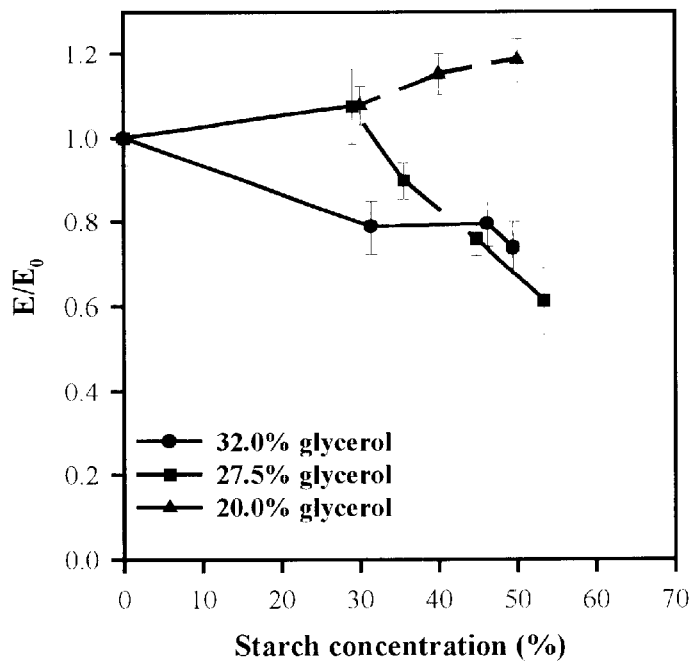
b)
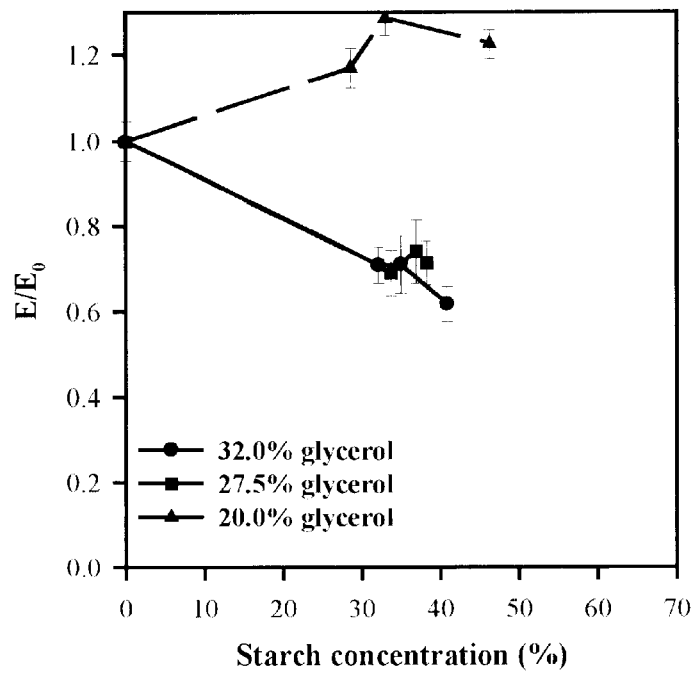
Figure 7. Relative Young's Modulus (E/E0) of LDPE/TPS blends:
a) LDPE2040, b) LDPE2049

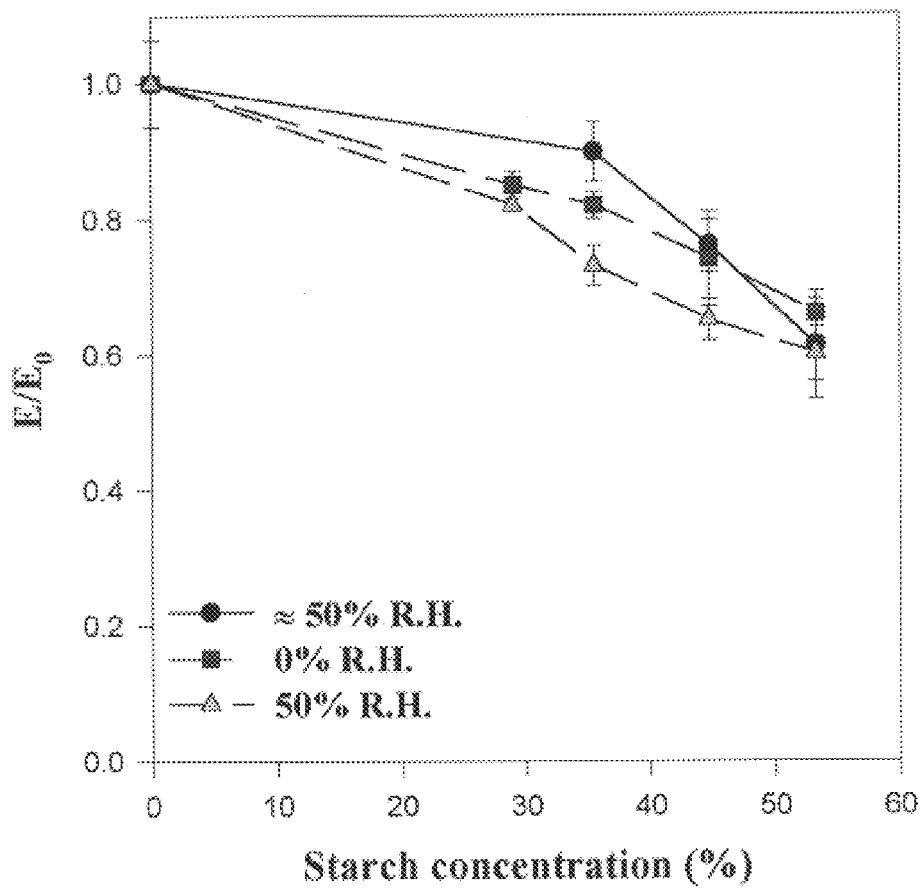
Figure 8. Relative Young modulus ($E/E_0$) of LDPE2040/TPS blends (27.5% glycerol in slurry). The properties of samples conditioned at 0% (■) and 50% R.H. (▲) were measured 1 year later than (●).

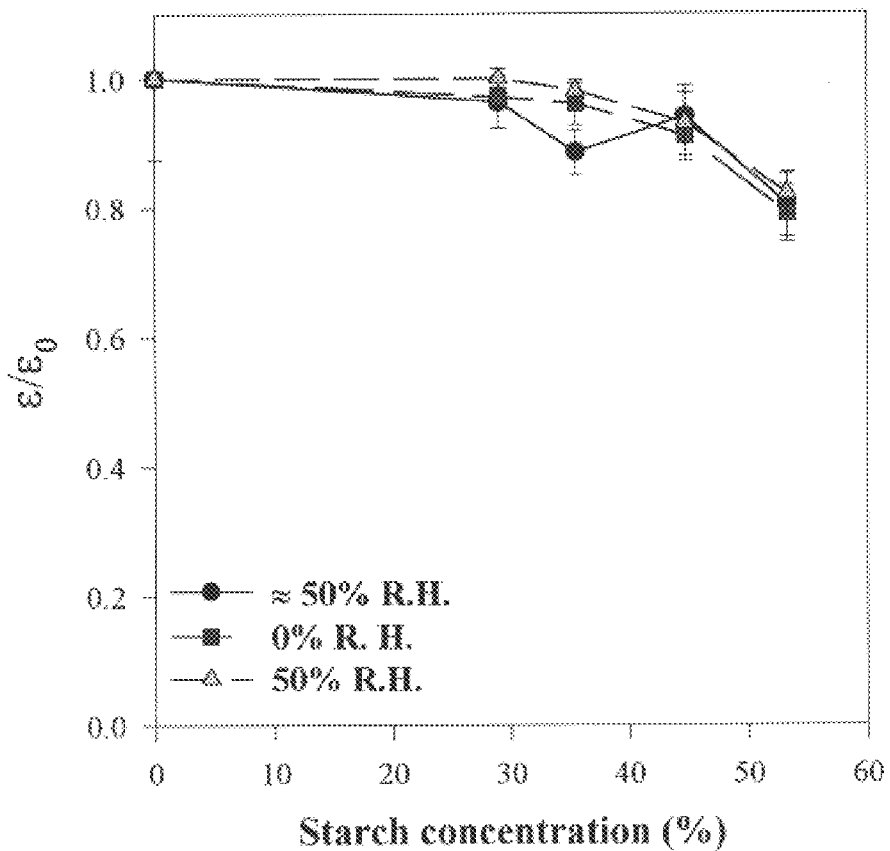
Figure 9. Relative elongation at break of LDPE2040/TPS blends (27.5% glycerol in slurry). The properties of samples conditioned at 0% (■) and 50% R.H. (▲) were measured 1 year later than (●).

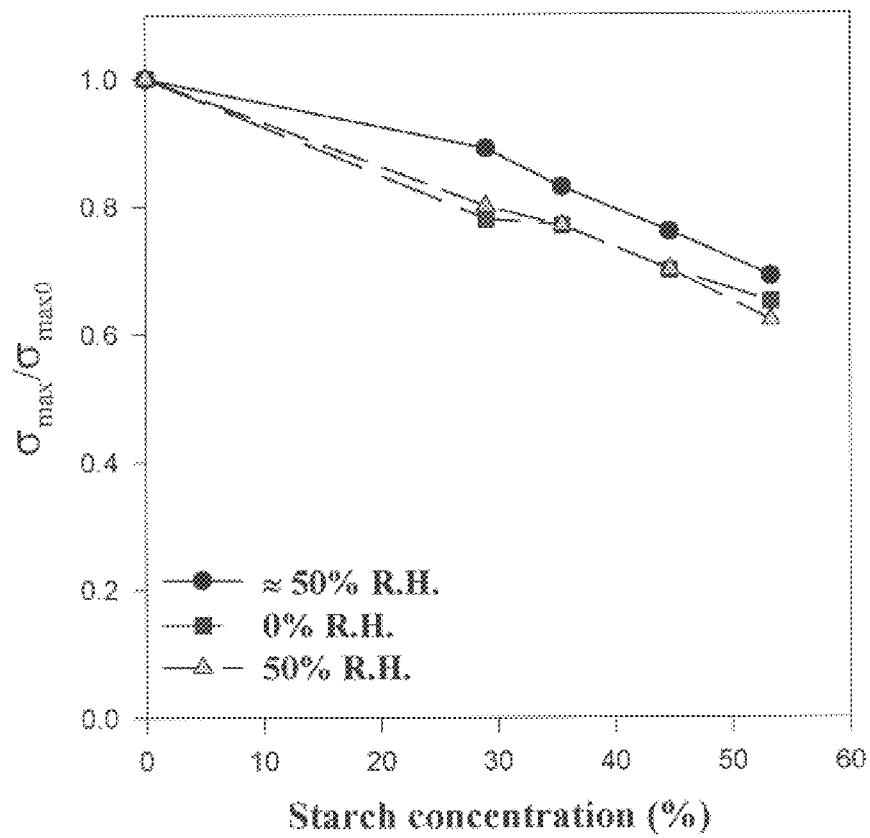
Figure 10. Relative engineering maximum strength (smax/smax0) of LDPE2040/TPS blends (27.5% glycerol in slurry). The properties of samples conditioned at 0% (■) and 50% R.H. (▲) were measured 1 year later than (●).

POLYMER COMPOSITIONS CONTAINING THERMOPLASTIC STARCH

BACKGROUND OF THE INVENTION

1. Field of Invention

This invention relates to polymer compositions containing thermoplastic starch and to a method of making these compositions.

2. The Prior Art

The blending of starch with synthetic polymers such as polyethylene and polypropylene has been the subject of increasing interest over recent years. The motivation is keen since starch is an abundant and inexpensive filler material. Moreover, starch may also impart partial biodegradability to the resulting blend.

Natural starch found in plant products can be isolated as a granular powder. It is known that natural starch can be treated at elevated temperature and pressure with addition of defined amounts of water to form a melt. Such a melt is referred to as gelatinized or destructurized starch. It is also known to mix destructurized starch with additives such as plasticizers to obtain a thermoplastic starch or TPS. It is known to mix these forms of starch with synthetic polymers and co-polymers. For example, U.S. Pat. No. 5,095,054, and Ind. Eng. Chem. Prod. Res. Dev. vol 19, p. 592 (1980) describe such a process.

Difficulties have arisen in that the presence of starch has had a negative impact on the physical properties of the resulting mixture when compared to the pure synthetic polymers. Furthermore, when starch is mixed with synthetic polymers or co-polymers, the starch domains are enveloped by the non-biodegradable synthetic polymers and consequently their biodegradability is significantly reduced.

A biodegradable material can be defined as one that is able to be converted to $CO_2$ and $H_2O$ by certain common microorganisms.

It is further unknown in the art to achieve mixtures of starch with non-biodegradable polymers where the starch domains are readily accessible for environmental degradation while still maintaining good mechanical properties.

With respect to the method of preparing polymer and TPS blends, some blending studies have been reported using internal mixers. Examples of such studies are found in international application WO 90/14388, European Patents 0 554 939 and 0 327 505.

It is also known from the article entitled "Processing and characterization of thermoplastic starch/polyethylene blends", published in Polymer, 38 (3), 647 (1997), to blend TPS and low density polyethylene (LDPE) in a continuous process using a co-rotating arrangement of a twin-screw extruder fed on one side by a single-screw extruder. The side extruder is used to prepare the TPS. The main extruder is used to prepare the LDPE melt which is combined with the TPS melt. However, such process results in TPS/LDPE blends having poor physical properties including the presence of water and of bubbles. Moreover, tensile properties of the extrudate dropped off dramatically at about 10% or more of TPS content. Tests revealed that the TPS, present as a dispersed phase in the extrudate, exhibited spherical or ellipsoidal shapes. Consequently, the extrudate was not easily biodegradable since the great majority of spherical or ellipsoidal shapes were enveloped in polyethylene which is not biodegradable. In other words, the dispersed TPS phase was not continuous.

The prior art is also silent on controlling process parameters to achieve controlled morphologies of the resulting blend.

Thus, it is an object of the present invention to provide a novel method for obtaining TPS/polymer blends having controllable and improved physical properties over the prior art blends.

It is a further object of the present invention to provide an improved product comprising a blend of TPS and polymer(s) having improved physical properties over prior art blends.

It is a related object of the invention to provide an improved product wherein the TPS phase is continuous so as to allow biodegradation processes to take place within the product.

In preferred embodiments, the product is extruded sheet or blown film.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

There is provided a method of preparing a thermoplastic starch and synthetic polymer blend, said method comprising the steps of:

(a) providing a starch suspension comprising starch, water and a plasticizer, preferably glycerol; (b) obtaining a thermoplastic starch from the starch suspension by causing gelatinization and plasticization of said starch suspension by exerting heat and pressure on said starch suspension in a first extrusion unit; (c) evaporating and venting off residual water from said thermoplastic starch to obtain a substantially moisture-free thermoplastic starch; (d) obtaining a melt of a synthetic polymer or a polymer blend in a second extrusion unit; and (e) combining the melt obtained from step (d) with the substantially moisture-free thermoplastic starch.

Also provided are compositions of matter comprising immiscible blends of thermoplastic starches and polymers. The compositions of matter exhibit favorable mechanical properties and provide a continuous or highly continuous thermoplastic phase so as to enhance the biodegradability of the composition of matter.

BRIEF DESCRIPTION OF THE DRAWINGS

FIG. 1A is a schematic illustration, top view, of the apparatus used in a preferred embodiment of the method of the present invention;

FIG. 1B is a side view;

FIGS. 2a)–2d) are scanning electron micrographs (SEM) of various embodiments of the product of the present invention wherein the product is an LDPE/TPS blend (ca. 30% TPS): (a) LDPE2040/TPS (20% glycerol) 500×; (b) LDPE2049/TPS (20% glycerol) 500×; (c) LDPE2040/TPS 27.5% glycerol) 1000×; (d) LDPE2049/TPS (27.5% glycerol) 500×;

FIG. 5 is the accessibility of starch domains in LDPE/TPS blends after 96 hours of extraction;

FIGS. 6a)–6b) is the relative elongation at break ($\epsilon/\epsilon_0$) of LDPE/TPS blends: (a) LDPE2040; (b) LDPE2049;

FIGS. 7a)–7b) is the relative Young's Modulus (E/EO) of LDPE/TPS blends: a) LDPE2040; b) LDPE2049;

FIG. 8 is the relative Young modulus ($E/E_0$) of LDPE2040/TPS blends (27.5% glycerol in slurry);

FIG. 9 is the relative elongation at break of LDPE2040/TPS blends (27.5% glycerol in slurry);

FIG. 10 is the relative engineering maximum strength (smax/smax0) of LDPE2040/TPS blends (27.5% glycerol in slurry).

DETAILED DESCRIPTION OF THE PREFERRED EMBODIMENT

Figures 3A, 3B, 3C, 3D:
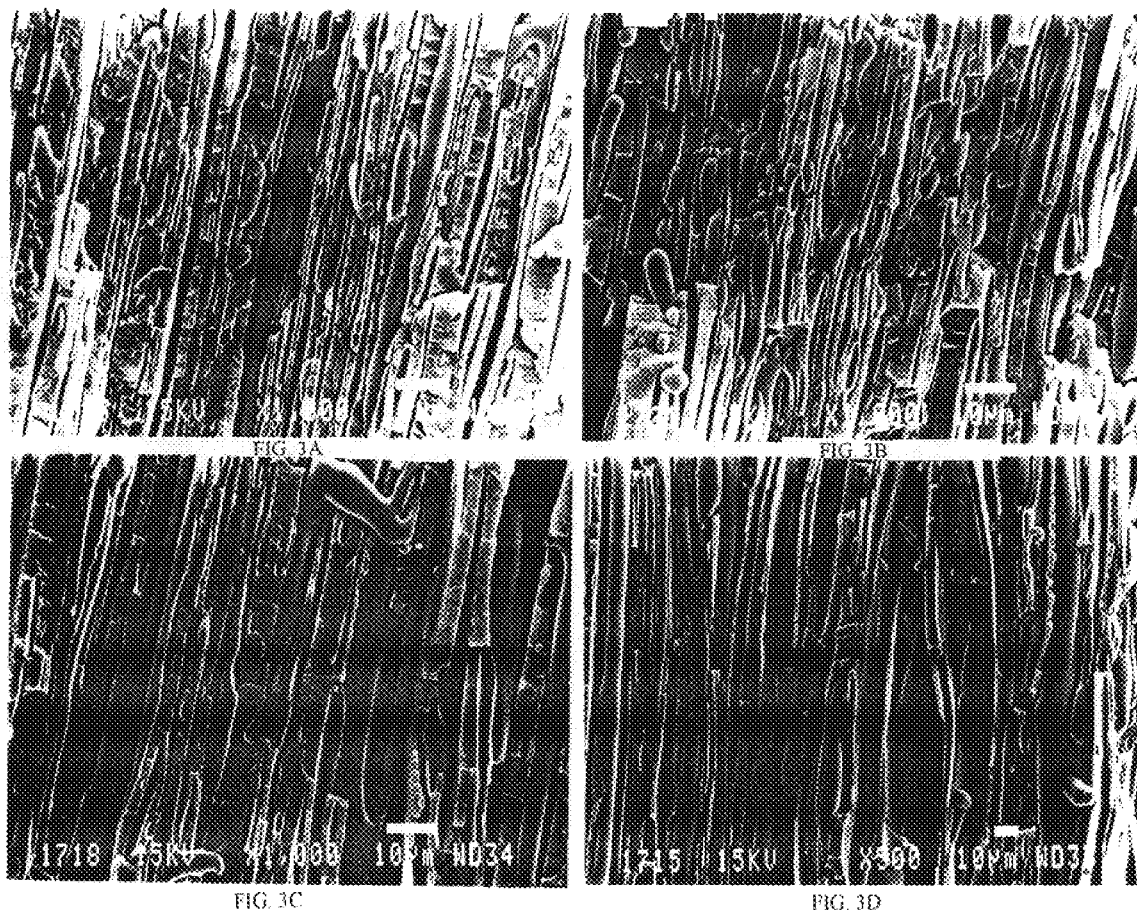
FIGS. 3a)–3d) are scanning electron micrographs (SEM) of various embodiments of the product of the present invention wherein the product is an LDPE2040/TPS (27.5% glycerol) blends cryogenically fractured in the axial direction: (a) 29% 1000×; (b) 35.5% 1000×; (c) 44.7% 1000×; and (d) 53.3% 500×.
Figure 4A:
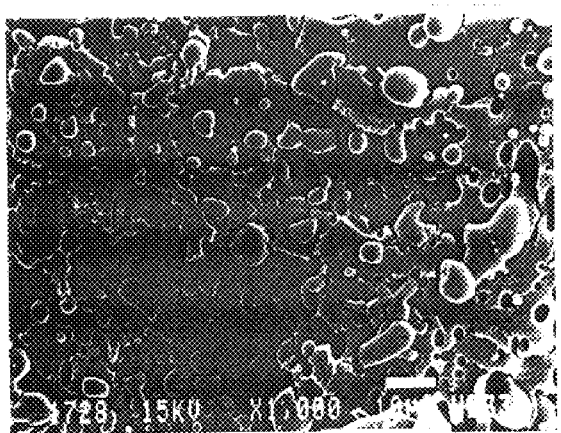
FIGS. 4a)–4d) are scanning electron micrographs (SEM) of various embodiments of the product of the present invention wherein the product is an LDPE2040TPS (27.5%glycerol) blends cryogenically fractured in the transversal direction: (a) 29% 1000×; (b) 35.5% 1000×; (c) 44.7% 1000×; and (d) 53.3% 500×.
Figure 4B:
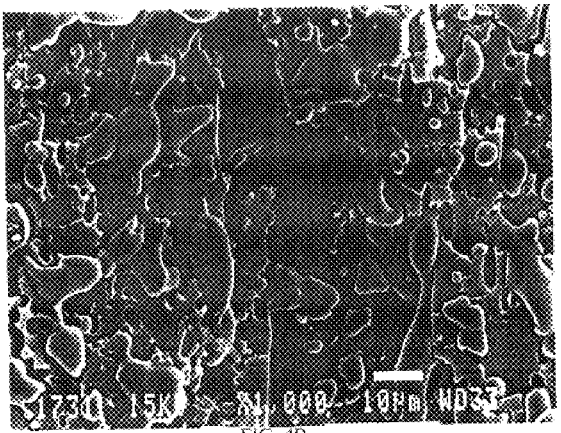
Figure 4C:
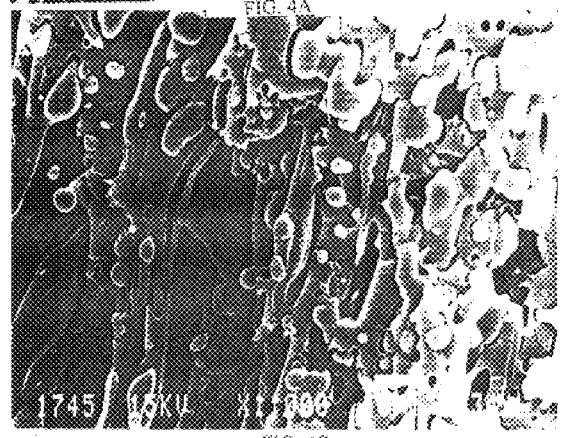
Figure 4D:
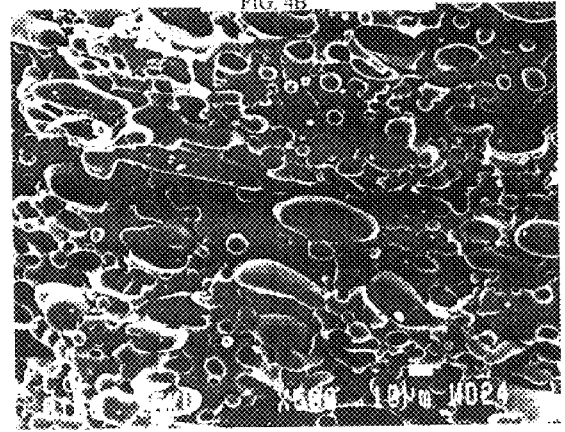

Before describing the present invention in detail, it is to be understood that the invention is not limited in its application to the details of construction and parts illustrated in the accompanying drawings and described herein. The invention is capable of other embodiments and of being practiced in various ways. It is also to be understood that the phraseology or terminology used herein is for the purpose of description and not limitation.

In general terms, the present invention provides novel compositions of matter including TPS/synthetic polymer blends having improved physical properties including tensile properties and increased TPS accessibility over prior art achievements. The invention concurrently provides a novel process for achieving the new compositions.

As used herein, the expression starch refers to any starch of natural origin whether processed, chemically modified or treated, including starches such as for example: wheat starch, corn starch, potato starch, and rice starch. Starch can also be derived from plant sources such as cassava, tapica, and pea. It is a polysaccharide that consists essentially of a blend of amylose and amylopectin.

Starch includes modified starches, such as chemically treated and cross-linked starches, and starches in which the hydroxyl groups have been substituted with organic acids, to provide esters or organic alcohols to provide ethers, with degrees of substitution in the range 0–3.

Starch includes extended starches, such as those extended with proteins; for example with soya protein.

As used herein, the expression synthetic polymer refers to any substantially water-insoluble synthetic thermoplastic or thermoset materials. Examples of substantially water-insoluble thermoplastic homopolymer resins are polyolefins, such as polyethylene (PE), polypropylene (PP), polyisobutylene; vinyl polymers, such as poly (vinyl chloride) (PVC), poly (vinyl acetate) (PVA), poly (vinyl carbazoles); polystyrenes; substantially water-insoluble polyacrylates or polymethacrylates, such as poly (acrylic acid) esters, poly (methacrylic acid) esters; polyacetals (POM); polyamides, such as nylon6, nylon-6,6, aliphatic and aromatic polyamides; polyesters, such as poly(ethylene terephthalate) (PET), poly(butylene terephthalate) (PBT); polyarylethers; polyurethanes, polycarbonates, polyimides, and high molar mass, substantially water-insoluble or crystallizable poly (alkylene oxides), such as poly(ethylene oxide), poly (propylene oxide). As well as mixtures thereof.

Further included are polyesters and polylactides that are considered biodegradable in short time periods. Examples of those water insoluble materials are polylactones such as poly(epsilon-caprolactone) and copolymers of epsilon-caprolactone with isocyanates; bacterial poly (hydroxyalkanoates), such as poly(hydroxybutyrate-3-hydroxyvalerate); and polylactides, such as poly(lactic acid), poly(glycolic acid) and copolymers comprising the repetitive units of both; as well as mixtures thereof.

Further included are substantially water-insoluble thermoplastic alpha-olefin copolymers. Examples of such copolymers are alkylene/vinyl ester-copolymers as ethylene/vinyl acetate-copolymers (EVA), ethylene/vinyl alcohol-copolymers (EVAL); alkylene/acrylate or methacrylate-copolymers preferably ethylene/acrylic acid-copolymers (EAA), ethylene/ethyl acrylate-copolymers (EEA), ethylene/methyl acrylate-copolymers (EMA); alkylene/maleic anhydride-copolymers preferably ethylene/maleic anhydride-copolymers; as well as mixtures thereof.

Further included are styrenic copolymers, which comprise random, block, graft or core-shell architectures. Examples of such styrenic copolymers are alpha-olefin/styrene-copolymers preferably hydrogenated and non-hydrogenated styrene/ethylene-butylene/styrene copolymers (SEBS), styrene/ethylene-butadiene copolymers (SEB); styrene acrylonitrile copolymers (SAN), acrylonitrile/butadiene/styrene copolymers (ABS); as well as mixtures thereof.

Further included are other copolymers such as acrylic acid ester/acrylonitrile copolymers, acrylamide/acrylonitrile copolymers, block copolymers of amide-esters, block copolymers of urethane-ethers, block copolymers of urethane-esters; as well as mixtures thereof.

Further included are thermoset resins such as epoxy, polyurethane, polyesters and their mixtures.

Further included are block or graft copolymers formed between homopolymers and copolymers of hydroxyacids and one or more of the following components:

(i) Cellulose or modified cellulose.

(ii) Amylose, amylopectin, or natural or modified starches.

(iii) Polymers resulting from the reaction of a compound selected from diols, prepolymers or polymers of polyesters having terminal diol groups with monomers selected from the group consisting of: bifunctional aromatic or aliphatic isocyanates; bifunctional aromatic or aliphatic epoxides; dicarboxylic aliphatic acids; dicarboxylic cycloaliphatic acids; or aromatic acids or anhydrides.

(iv) Polyurethanes, polyamides-urethanes from diisocyanates and amino-alcohols, polyamides, polyesters-amides from dicarboxylic acids and amino-alcohols, and polyester-ureas from aminoacids and diesters of glycols.

(v) Polyhydroxylate polymers;

(vi) Polyvinyl pyrrolidone, polyvinyl pyrrolidone-vinyl-acetate copolymers and polyetheloxazoline. As well as mixtures thereof.

In the method and product of the present invention, the addition of compatibilizers or coupling agents can also be envisaged. Compatibilizers improve the adhesion at the interface and can be particularly useful at further improving the properties at high loadings of thermoplastic starch. The addition of an interfacial modifier still allows for the obtention of highly continuous and co-continuous networks however the scale of said network becomes substantially finer.

Suitable compatibilizers or coupling agents for the TPS based blends can be polymers or copolymers having functional groups that present specific interactions with starch molecules and/or are capable of undergoing chemical reactions with starch functional groups to result in a chemical bond. Those compatibilizers have preferably a low interfacial tension with the synthetic polymer, but more preferably a partial or full miscibility with the synthetic polymer. Examples of functional groups that present specific interactions and/or are capable to react with starch are: Hydroxyl, carboxyl or carboxylate, tertiary amino and/or quaternary ammonium, sulfoxyl and/or sulfoxylate groups, and vinyl pyrrolidone copolymers.

The compatibilizer having hydroxyl groups is preferably a polymer containing vinyl alcohol units. More preferably it is a poly (vinyl ester) wherein the ester groups are partially hydrolyzed or a copolymer containing vinyl alcohol units as well as other units such as are obtained by copolymerization of vinyl esters, preferably vinyl acetate, with monomers such as ethylene (EVOH), propylene, vinyl chloride, vinyl ethers, acrylonitrile, acrylamide, omega-octadecene, vinyl-butyl ether, vinyl-octadecyl ether, vinyl pyrrolidone and other known monomers, with subsequent hydrolysis of at least some of the vinyl-ester groups. Preferred copolymers are e.g. poly (vinyl alcohol-co-vinyl-acetate); ethylene/vinyl alcohol/vinyl acetate copolymers; ethylene/vinyl chloride/vinyl alcohol/vinyl acetate graft copolymers; vinyl alcohol/vinyl acetate/vinyl chloride copolymers; vinyl alcohol/vinyl acetate/vinyl chloride/diacryl amide copolymers; vinyl alcohol/vinyl butyral copolymers; vinyl alcohol/vinyl acetate/vinyl pyrrolidone copolymers; vinyl alcohol/styrene copolymers.

The compatibilizer containing carboxylic acid and/or carboxylate groups is preferably a synthetic polymer, preferably a copolymer containing carboxylate groups as well as other units such as are obtained by copolymerization of acrylic acid, methacrylic acid, crotonic acid, maleic acid, itaconic acid, e.g. in their acid or carboxylate form, with monomers such as ethylene, vinyl chloride, vinyl esters such as vinyl acetate, vinyl ethers, acrylic acid esters, acrylonitrile, methacrylic acid esters, maleic acid esters, acrylamide, omega-octadecene, vinyl-butyl ether, vinyl pyrrolidone and other known monomers. If a carboxyl group-containing monomer is used for preparing the polymer, then at least a part of the carboxyl groups must be neutralized with a cation. Preferred copolymers containing carboxylate groups are those which can be described as being derived from acrylic acid, methacrylic acid, crotonic acid, maleic acid, itaconic acid, methylacrylate, methylmethacrylate, acrylamide, acrylonitrile and/or methylvinylether. More preferred polymers are those that can be described as being derived from acrylic acid, methacrylic acid, maleic acid, methacrylate, ethyl acrylate and/or methylvinylether. Such copolymers may be also copolymerized with ethylene, propylene, or styrene. Such copolymers are, e.g., poly (acrylic acid-co-vinyl acetate); ethylene/vinyl acid/vinyl acetate copolymers; ethylene/vinyl chloride/acrylic acid/vinyl acetate graft copolymers; acrylic acid/vinyl acetate/vinyl chloride copolymers; acrylic acid/vinyl methylether copolymers; vinyl acetate/acrylic acid/acrylic acid methylester copolymer; vinyl acetate/crotonic acid copolymers; vinyl acetate/maleic acid copolymers; methacrylic acid/vinyl acetate/vinyl pyrrolidone copolymers; acrylic acid/ acrylonitrile copolymer; ethylene/propylene/acrylic acid copolymer; and styrene/acrylic acid copolymer, wherein a part or all of the acid groups are present in their carboxylate form. Copolymers that contain carboxylic groups are preferably copolymer of acids with ethylene, e.g. the ethylene-acrylic-acid copolymer in the form of its salt or an ethylene-methacrylic acid copolymer in the form of its salt.

Compatibilizers which contain tertiary amino groups and/or salts thereof and/or quaternary ammonium groups are preferably a synthetic polymer, as obtained by the polymerization of monomers containing tertiary amino groups and/or salts thereof and/or quaternary amino groups such as poly (2-vinyl pyridine); poly (4-vinyl pyridine); polyvinyl carbazole, I-vinyl imidazole and/or salts thereof and/or their quaternized derivatives as well as with other polymers as are obtained by copolymerization of such amines with other monomers such as acrylonitrile, butyl methacrylate, styrene and other known monomers. The expression amine salts includes the salts formed with an inorganic or organic acid, e.g. salts with inorganic or organic acids such as HCl, H2SO4, and acetic acid. The expressions "quaternized derivative" and "quaternary ammonium groups" mean quaternized derivatives of tertiary amines, e.g. quaternized with an alkyl halide such as methyl chloride. Preferred polymers are those derived from 2-vinyl-pyridine, 4-vinyl pyridine and vinyl carbazole.

Compatibilizers having sulphonic acid and/or sulfonate functional groups are preferably styrene sulphonic acid polymers, styrene sulfonic acid copolymers, and salts thereof. More preferably they are block copolymers of sulfonated styrene with unsaturated monomers such as ethylene, propylene, butylene, isobutylene, butadiene, isoprene, and/or styrene. Preferred salts thereof, including the corresponding sulfonates are their salts with metal ions or the ammonium ion, preferably an alkali metal ion, magnesium or zinc or $NH_4^+$, preferably sodium, potassium or zinc, preferably the sodium salt.

Compatibilizers containing vinyl pyrrolidone are preferably copolymers of vinyl pyrrolidone with one or more monomers selected from the group of vinyl esters, vinyl alcohol, allyl alcohol, ethylene, propylene, butylene, isoprene, butadiene, styrene, vinyl ethers, and dimethylaminoethyl methacrylate. Preferred are copolymers of vinyl pyrrolidone with a monomer selected from the group consisting of vinyl esters, vinyl alcohol, styrene and dimethylaminoethyl methacrylate. Preferred are further the poly (N-vinyl pyrrolidone-vinyl ester) copolymers and from these the poly (N-vinyl pyrrolidone-vinyl acetate) copolymers.

As used herein when referring to immiscible TPS/polymer compositions, the term "continuous" refers to either the TPS or the polymer phase being essentially constituted of a network of interconnected domains. The term "co-continuous" refers to a composition wherein both the TPS and the polymer phase are continuous. The expression "highly continuous TPS phase" refers to a composition where the TPS phase is dispersed in the polymer phase and yet the TPS domains are nearly all interconnected. Highly continuous can be defined as the case where 50% or more of the TPS is extractable. The per-cent extractable TPS is based on the weight loss of TPS from a 1 mm length (machine-direction) ×7.5 mm width (cross-direction) specimen subjected to hydrolytic degradation in a solution of HCl at 60 degrees Celsius for 96–150 hours. Extracted samples were vigorously washed with distilled water and dried at 60 degrees Celsius in a vacuum oven for 48 hours prior to weight measurement. The concept of continuity of the TPS phase is of particular importance when measuring the biodegradability of a material. If the TPS phase is not continuous or highly continuous, the TPS domains will be encapsulated by a non-degradable polymer rendering the majority of the TPS phase substantially less accessible to biodegradation.

As used herein, the term "plasticizer" refers to any suitable plasticizer for achieving a TPS. Plasticizers include for example: adipic acid derivatives, such as tridecyl adipate; benzoic acid derivatives, such as isodecyl benzoate; citric acid derivatives, such as tributyl citrate; glycerol itself and derivatives; phosphoric acid derivatives, such as tributyl phosphate; polyesters; sebacic acid derivatives, such as dimethyl sebacate; urea.

The plasticizer can be selected from the group consisting of glycerin, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neopentyl glycol, trimethylol propane, pentaerythritol, sorbitol, and the acetate, ethoxylate, and propoxylate derivatives thereof.

Moreover, the plasticizer can be selected from the group consisting of sorbitol ethoxylate, glycerol ethoxylate, pentaerythritol ethoxylate, sorbitol acetate, and pentaerythritol acetate.

The plasticizer is present in a amount of from 1% to 50 wt %, but preferably 5% to 50wt % and most preferably 10% to 35 wt % calculated on the total weight of the final composition. When expressed in term of wt % in the initial slurry, the plasticizer was present in a proportion of about 10 to about 32 wt %.

All the references to % glycerol in the reported data refer to the amount of glycerol in the initial slurry (TABLE 1). In the case where water is substantially eliminated from the TPS, the % glycerol (or any other plasticizer) in the blend material after extrusion can be calculated from the slurry concentrations in TABLE 1 based on the following calculation. For example, in a final extruded blend product containing 53% LDPE/47% TPS prepared from a 48.5% starch/27.5% glycerol/24% water suspension, the per-cent glycerol in the extrudate is about 19%. If water is present at substantial levels in the final blend product, its weight will also need to be taken into account.

Description of the Method of Preparing the Novel Compositions

The method of the present invention uses a starch suspension as a first feed material and a synthetic polymer as a second feed material. The synthetic polymer is preferably ground into granules for ease of melt processing through a screw-type blender-extruder.

Referring now to FIGS. 1 and 2, there is shown a preferred embodiment of the extrusion apparatus used to carry-out the method of the invention. Referring to FIG. 1a, an upper view of the extrusion system 10 shows a twin-screw extruder (TSE) 12 to which is attached a single-screw extruder (SSE) 14. In sharp contrast with the prior art, the thermoplastic starch (TPS) is prepared in the TSE 12 while the synthetic polymer, in this case low density polyethylene (LDPE), is melted in SSE 14. This method will be further described hereinbelow.

Preparation of the Starch Suspension

Wheat starch was mixed in different proportions with water and glycerol. During the starch extrusion, water is important to promote the gelatinization process. Once gelatinized, the glycerol plasticizes starch. In addition to plasticizing starch; glycerol decreases the viscosity of TPS. In the suspension, the starch content varied from 48 to 50% by weight. Water and glycerol were varied from 20% to 30% and from 32% to 19% by weight, respectively. The glycerol concentration was varied in order to achieve TPS of varying and controllable viscosities. The water content was modified to maintain a constant liquid/solid ratio of about 1:1 v/v. Three examples are reported in Table 1 below. All contents are expressed in terms of %/wt of suspension.
Table 1

TABLE 1

| Example | Starch content* | Glycerol content* | Water content* |
|---------|-----------------|-------------------|----------------|
| 1 | 48 | 32 | 20 |
| 2 | 48.5 | 27.5 | 24 |
| 3 | 50 | 20 | 30 |

*In the initial slurry

In a typical suspension, 640 g of glycerol was mixed with 400 g of distilled water and placed in a recipient. 960 g of starch powder was poured in the recipient containing water and glycerol and stirred to give a homogeneous slurry. The slurry, once made, was used immediately in the preparation of LDPE/TPS blends. Starch suspensions are susceptible to the problem of sedimentation. Furthermore, the viscosity of the starch suspension increases with time. This increase has been attributed to the solvation of starch molecules and further re-arrangement into a gel-like structure. For these reasons the starch suspension must be used as fresh as possible, especially if the viscosity affects the feeding rate.

Feeding the mixture to the extruder as a slurry is a novel approach to preparing these materials and ensures that the starch is fully destructurized and that the glycerol is well dispersed throughout the starch material. Both of those elements are necessary components to achieving blends with the high elongational properties achieved by the present invention.

One-step Extrusion Process a) Basic Setup

Blending was carried out in a one-step process. A single-screw extruder (SSE) 14 was connected to an intermediate zone of a co-rotating twin-screw extruder (TSE) 12 using a leak-proof adapter. The schematic representation of the upper and side views of the extrusion system are showed in FIGS. 1 and 2, respectively. This one-step approach allows for the melt-melt mixing of the components which improves the morphology control of the dispersed TPS phase. It also provides the possibility of minimizing the contact time between the two polymers at high temperature which is the principal parameter for controlling the thermal degradation of TPS. The single screw used was from C.W. Brabender Instruments (L/D=26, length=495 mm, and compression ratio=2). The twin-screw was a Leistritz AG (LM 30.34), LID=28, and length=960 mm. The above described setup allows for the separation of the different processes occurring in this operation. Accordingly, the melting of LDPE takes place in SSE 14, while both the starch gelatinization and plasticization (SGP) and melt blending occur in TSE 12. The mixing of TPS and PE occurs in the latter half of TSE 12. For ease of description, TSE 12 is pictorially divided into zones 16 to 30 as the blending progresses.

b) TPS Preparation

An important feature of the present method is the preparation of the TPS which comprises the steps of starch gelatinization and plasticization (SGP). The screw configuration in TSE 12 was chosen to give a long enough residence time, which permits SGP in the first zones of TSE 12. SGP took place over three sub-sections of TSE 12: feeding section 16, SGP sections 18 and 20 and water extraction section 22. The starch suspension was fed at a temperature lower than 25° C. in the first section of TSE 12. This zone was water-cooled in order to maintain a low temperature. SGP was carried out in the sections 18 and 20 of the TSE 12. Due to the thermal instability of starch, SGP was carried out at 70° and 90° C. in the sections 18 and 20, respectively. Several kneading sections were used to homogenize the resulting TPS. Back-flow kneading elements were also adapted to increase the residence time and, consequently, ensure the complete destructuring and the homogeneity of the TPS. It also served to increase the extrusion pressure before the venting zone 22. Water extraction took place in section 22 of TSE 12. Low-pressure elements, a higher temperature (110° C.) and vacuum were found to improve the water extraction. The venting zone 22 was connected to a condensation system, which avoided the passage of volatiles through the vacuum line. Once the TPS is substantially water-free, it can be blended with the second polymer, in this case LDPE.

The flow rate of the extruded TPS had an influence on the pressure exerted by the starch and its final appearance. In order to study this phenomenon, an TSE extruder configuration using just five zones was used. This configuration was similar to the original eight zones configuration, but zones 24, 26, 28 and 30 were taken out. Three capillary dies were used to measure the viscosity of TPS. The flow rate of the starch suspension was compared to that of TPS at the exit of the capillary die. Surprisingly, the difference between both flow rates was almost equal to the water content in the starch suspension. Likewise, TGA measurements indicated that the water content in TPS was around 1%. This approach is thus very effective in removing the water from thermoplastic starch. This is a critical point since excess water gives rise to bubbles in the resulting starch/polymer blend. These bubbles not only affect aesthetics but also diminish the mechanical properties of the blend. As such, TPS will be considered as a binary system composed of starch and glycerol.

In studying the effect of flow rate of the starch suspension on the quality of the extrudate, lower and upper limits of feeding were found. The lower limit was imposed by the increased residence time of the TPS. It is well known that the TSE works better under starve-fed conditions. In such a situation, the residence time is controlled by the screw configuration, the flow rate and the screw speed. The screw speed was maintained constant at 150-rpm in the whole series of melt mixing and viscosity measurement experiments. Evidence of degradation was found at flow rates of the extruded TPS lower than 20 g/min. The appearance of TPS changed from a transparent and flexible material to a yellowish more rigid one. When the flow rate of TPS was lower than the mentioned limit, an unexpected increase in the pressure was also monitored. At higher flow rates, the pressure was proportional to the measured flow rate. The upper limit for the flow rate of TPS was imposed by the water extraction in the venting zone 22. Problems of foaming were observed at flow rates between 45–50 g/min of TPS. In contrast to the lower limit, the pressure exerted by the foamed TPS decreased as the flow rate increased. Both phenomena were produced by the presence of water in the extrudate. Water vapor, at 150° C. was responsible for the foaming of TPS. Moreover, water excess reduced the viscosity of TPS in the extruder. This upper limit can be overcome by the addition of another venting zone or the modification of the existing one with more efficient equipment. As is mentioned above, the flow rate, temperature, and screw design are important parameters to control.

c) Mixing

The blend mixing section can be divided into three sub-sections: LDPE addition zone 24 mixing zone 26 and 28 and pumping zone 30. The temperature of the whole mixing section was maintained constant at 150° C. As observed in FIG. 1a, the LDPE addition zone 24 has no heating element, however, the temperature was maintained around 150° C. by the convection heating of the neighboring zones 14 and 26 and the molten LDPE. The melt mixing of LDPE and TPS starts in zone 24. The melt mixing continued through the next two zones 26 and 28 aided by several kneading and mixing elements. The pumping zone 30 is necessary to pressurize the extrudate through the die head.

The proportion of thermoplastic starch in terms of wt % of the resulting TPS/polymer blend was about 10 to 60 wt %, and preferably about 20 to 55 wt %.

It is to be noted that by attaching the single-screw extruder 14 progressively downstream (zones 26, 28 or 30) on the twin-screw 12 it is possible to achieve the same level of morphology control as reported here at very low blend residence times. Thus, one of the advantages of the single step approach is that it can be used to minimize the residence time of starch in contact with a high melting polymer. Therefore, TPS can be blended with high melting temperature polymers such as PP, PS, PET etc. while still minimizing thermal degradation of the starch.

The die head 32 and SSE 14 were operated at the same temperature as the mixing section. The screw speed of SSE 14 was kept constant using an arbitrary measure of the motor speed (2.5) and the flow rate of LDPE was controlled with the aid of a pellet feeder. Maximum pumping of SSE 14 under these conditions was 100 g/min.

d) Sheet Take-up

LDPE/TPS blends were extruded through a rectangular die. Blends were quenched using calendar rolls. Calendar rolls were used because blends could not be quenched in cold water due to the highly hydrophilic nature of TPS. The strain ratio, the ratio between the speed of extrudate and the speed of the ribbon at the exit of the calendar, was around 2. That imposed a machine direction deformation on the ribbon. The morphology of those blends showed evidence of that deformation. The evolution of the morphology of LDPE/TPS blends are reported below.

Novel TPS/polymer Compositions

The morphology of LDPE/TPS blends prepared in accordance with the method of the present invention was studied using a scanning electron microscope (SEM). LDPE/TPS blend ribbons were cryogenically fractured to obtain surfaces both axial and transversal to the machine direction. Fractured samples were coated with gold palladium alloy and further observed in a JSM-820 SEM.

a) Influence of the Glycerol Content

Micrographs taken in the axial direction (machine direction) of PE blended with ca. 30% of TPS and compounded with either 20% or 27.5% of glycerol is shown in FIG. 2. The particle diameter of TPS domains compounded with 20% glycerol was larger than that of TPS having higher glycerol content. Furthermore, TPS (20% glycerol) domains demonstrated only a slight deformation even though all blends were quenched at similar take-up speeds. This could be the consequence of the higher viscosity of TPS compounded with only 20% glycerol. The viscosity of polymers compounded with low molecular weight plasticizer decreased as the plasticizer content increased. Particles of TPS made with 20% glycerol were elliptical with a minor axis diameter ranging between 10 um to >50 um. That means that those particles were larger than the original granular starch. This is surprising considering that TPS has been completely gelatinized and plasticized. It seems that the viscosity of the two LDPE types tested was not high enough to disintegrate TPS particles containing 20% glycerol into a smaller dispersed phase. However, blends prepared with LDPE2040, the PE having the lower melt flow index, demonstrates a finer particle size than that of LDPE2049. On the other hand, the TPS compounded with the larger quantity of glycerol was deformed into fiber particles by both PE matrix materials.

b) Influence of the LDPE/TPS Concentration Ratio

The evolution of the TPS domains as a function of composition in LDPE/TPS blends in the axial direction is shown in FIG. 3. It is important to note that the glycerol content (based on the slurry) in this TPS was 27.5%. The fiber-like structures (found throughout the thickness of the sheet) are a result of the high concentration of TPS and are also due to deformation processes experienced in the die and as the material exits the die. This structure is preserved by quenching calendar rolls. The fiber diameter increased from 2–4 um to >10 um as the concentration of TPS increased from 29% to 53.5% TPS. TPS fiber-fiber coalescence is evident at TPS concentrations of 35.5% or more. The morphology of LDPE/TPS blends fractured in the transverse direction revealed that TPS domains were more strongly deformed in the machine direction, see FIG. 4. As observed in the axial view micrographs, the fiber diameter increased as the TPS concentration increased. However, evidence of coalescence was observed even at the lowest TPS concentration (29.0%). Coalescence of the TPS domains occurred to a very high degree at 53.3% TPS.

It is possible, if desired, to form a thin layer of LDPE at the surface of the product.

Accessibility of Thermoplastic Starch

Starch-based materials require that two important, and closely related, aspects be controlled: water absorption and biodegradability. Water permits the microorganisms to move and also helps them to metabolize starch. Nevertheless, water may also affect the dimensional stability of starch-based materials and their properties. The present invention tackles this problem by controlling the morphology of these blends. The continuous structure allows for the accessibility of starch domains. The accessibility of starch domains in LDPE2040/TPS blends was studied. The percent extractable TPS is based on the weight loss of TPS from a 1 mm length (machine-direction) ×7.5 mm width (cross-direction) specimen subjected to hydrolytic degradation in a solution of HCl at 60 degrees Celsius for 96–150 hours. Extracted samples were vigorously washed with distilled water and dried at 60 degrees Celsius in a vacuum oven for 48 hours prior to weight measurement.

Blends of LDPE/TPS having higher glycerol contents showed a fiber-like and nearly continuous morphology in the machine direction. Consequently, a higher accessibility in the axial direction was expected. In order to determine the influence of such connectivity on degradability, samples were exposed to hydrolytic extraction, see FIG. 5.

In both, LDPE2049/TPS (20% glycerol) and LDPE2040/TPS (27.5% glycerol), the accessibility of starch domains increases with TPS concentration and reaches a maximum at the phase inversion region. TPS containing a high glycerol content of about 27.5 wt % was more accessible for starch extraction. This was unexpectedly achieved because of the fiber-like morphology observed in the SEM micrographs. In blends containing more than 45% by weight TPS, the starch phase has been completely extracted, that was an indication of a co-continuous morphology. Co-continuity is very desirable for a maximum accessibility of the biodegradable portion in synthetic polymer/starch blends.

Tensile Properties a) Machine Direction

LDPE/TPS blends were tested according to the ASTM-D-638 method. Tensile specimens of type V were cut longitudinally from LDPE/TPS ribbons. Samples were strained at 10 mm/min on a M30K machine (JJ Instruments) equipped with a 5 kN cell and a data acquisition system. The average values of the Young's modulus, maximum tensile strength and elongation at break were calculated from at least 12 measurements.

The relative elongation at break ($\epsilon/\epsilon_0$) of LDPE/TPS blends is presented in TABLE 2 and FIG. 6. In TABLE 2, $\epsilon$ and $\epsilon_0$ are the elongation at break of LDPE/TPS blends and pure LDPE, respectively. Blends containing high and intermediate glycerol contents maintain a high machine direction elongation at break, modulus and strength even at high loading. In fact, the elongation at break of those blends are virtually the same as the pure polyethylene. In ductile synthetic polymer blends the high loading of an immiscible second phase results in highly fragile materials. This occurs because elongation at break is a parameter which is highly sensitive to the state of the interface. Immiscible TPS/PE blends demonstrate high machine direction tensile properties even in the absence of an interfacial modifier. Improvement in the elongation at break of these blends is an important feature compared to prior art blends. This is probably due to the highly continuous nature of the dispersed TPS phase as well as the improved removal of water during processing. In the prior art methods, TPS was blended with LDPE and then passed through the venting section. Since the dispersed TPS is encapsulated in an LDPE matrix, this led to impeded water removal. The presence of water at the processing temperature can produce bubbles in the extrudate weakening the final product. In the present invention, water is extracted from TPS before mixing with polyethylene and the problem of residual water is circumvented.

Blends having the lowest glycerol content failed at lower elongation. This phenomenon was more marked in the case of blends prepared with LDPE2049. The drop in the elongation at break of blends prepared with TPS compounded with 20.0% glycerol was expected because of the larger size and poor dispersion of starch particles in the LDPE matrix.

The relative Young's modulus and maximum tensile strength of LDPE ($E_0$) and LDPE/TPS blends (E) are shown in TABLE 2 and FIG. 7. The modulus and maximum strength of LDPE/TPS blends compounded with high glycerol content decreases somewhat with TPS content. It is worth noting that the 2040 LDPE/TPS blends with 27.5% glycerol maintain almost the same machine direction modulus and maximum strength of polyethylene up to 35% TPS loadings. In contrast, the addition of TPS compounded with 20.0% glycerol augmented the modulus of LDPE. That modulus was less than for LDPE/granular starch composites.

b) Cross Direction

Microtensile cross direction properties are shown in TABLE 3 for samples conditioned for 48 hrs at 0% and 50% humidity. At 29% TPS, the modulus and maximum tensile strength are maintained at 80 and 83% the level of polyethylene at 0% humidity. At 50% humidity the modulus and maximum tensile strength property retention is at 71 and 76% respectively. The elongation at break is diminished more significantly, but under all concentration conditions studied, the material remains highly ductile. Thus, even the cross properties in this material perform much better than that observed in typical immiscible synthetic polymer blends. It must be underlined that this blend material was prepared with a machine direction melt draw ratio of about 2:1. This results in preferential dispersed phase orientation in the machine direction. Thus it is normal that the cross direction properties should be weaker. It is possible to substantially improve the cross direction properties by minimizing the melt-draw ratio. Machine direction orientation can also be reduced by reducing the glycerol content. FIG. 2 showed less elongation of the TPS phase in the md when 20% glycerol was used as compared to the 27.5% case. For the case of 20% glycerol where significantly less machine direction elongation was obtained, the cross elongation at break properties improve substantially as shown in TABLE 3.

Table 3 clearly indicates that the cross direction modulus is substantially increased at lower glycerol contents.

A number of parameters can be brought to bear in order to control the properties of the blend system. Applying an axial draw ratio can be used to modify the properties in the machine direction. Minimizing the axial draw results in improved cross direction properties (particularly cross direction elongation at break). The system still maintains high continuity even under those latter conditions. Reducing the per-cent glycerol results in an increase in the modulus of the blends. It is possible using the above parameters to tailor the material to a given application.

c) Effect of Aging

FIGS. 8–10 demonstrate the properties in the machine direction for the 27.5% glycerol preparation. Two cases are shown: the properties soon after preparation (tested at about 50% humidity) and the properties after one year (conditioned at 0% and 50% humidity for 48 hrs prior to testing). There is little effect of aging on the modulus, maximum tensile strength and elongation at break.

d) Effect of Humidity

In order to evaluate the effect of short term exposure to humidity on mechanical properties, the samples were conditioned for 48 hrs in 0% and 50% humidity environments as already mentioned above. The results for the machine direction properties are shown in FIGS. 8–10 for the 27.5 glycerol preparations. For that glycerol preparation there is very little effect of humidity on the machine direction elongation at break and maximum strength. A small effect of humidity is observed on the modulus.

The cross direction properties shown in TABLE 3 demonstrate similar tendencies as above for the 27.5% glycerol study. Very little effect of humidity is observed on the maximum strength and elongation at break. Some effect on the modulus is observed. TABLE 3 indicates that for the 20% glycerol preparation, humidity also results in a substantial increase in the elongation at break. At 20% glycerol no effect of humidity is observed on the maximum strength. An effect on modulus is also observed at the 20% glycerol concentration.

Transparency

One of the very particular features of the novel compositions of the present invention is that 1 mm thick ribbons of this blend with as much as 53% thermoplastic starch demonstrate a substantial level of transparency.

Consequently, the results reported herein reveal LDPE/TPS blends, in sheet form, with high loadings of TPS that maintain essentially the same elongation at break in the machine direction as pure PE even in the absence of interfacial modifier(s). The modulus and maximum tensile strength are also maintained at high levels. Good cross-properties are also obtained. These blends are prepared in a combined single-screw/twin-screw one-step process under carefully controlled processing conditions (flow rate, temperature, screw design, devolatization) and glycerol content. The morphology can be controlled by the composition and processing conditions to yield a highly continuous or co-continuous structure. In such a case, nearly all of the TPS becomes accessible for biodegradation.

In addition, the method of the present invention was also tested on blown film production. These experiments provided a film material which exhibited a high level of transparency even at high loadings of TPS.

Although the invention has been described above with respect to specific embodiments, it will be evident to a person skilled in the art that it may be modified and refined in various ways. It is therefore wished to have it understood that the present invention should not be limited in scope, except by the terms of the following claims.

TABLE 2

Mechanical properties of LDPE/TPS blends (ribbons) in the machine direction.

| Material | TPS (%) | Glycerol in slurry (%) | $\sigma_{max}$ (MPa) | $\sigma_{max}/\sigma_{max0}$ | $\epsilon_b$ (%) | $\epsilon_b/\epsilon_{b0}$ | E (MPa) | $E/E_0$ |
|---|---|---|---|---|---|---|---|---|
| a). LDPE2040 MFI = 12.0 g/10 min. | | | | | | | | |
| PE2040 | 0.0 | 0.0 | 11.8 | 1.00 | 482 | 1.00 | 55.9 | 1.00 |
| P0A3 | 31.4 | 32.0 | 9.7 | 0.83 | 465 | 0.97 | 44.0 | 0.79 |
| P0A4 | 46.2 | 32.0 | 8.7 | 0.74 | 449 | 0.93 | 44.4 | 0.79 |
| P0A5 | 49.5 | 32.0 | 8.7 | 0.74 | 415 | 0.86 | 41.2 | 0.74 |
| P0A13 | 29.0 | 27.5 | 10.5 | 0.89 | 464 | 0.96 | 60.0 | 1.08 |
| P0A14 | 35.5 | 27.5 | 9.8 | 0.83 | 427 | 0.89 | 50.1 | 0.90 |
| P0A15 | 44.7 | 27.5 | 9.0 | 0.76 | 453 | 0.94 | 42.4 | 0.76 |
| P0A16 | 53.3 | 27.5 | 8.2 | 0.69 | 388 | 0.80 | 34.2 | 0.61 |
| P0A23 | 29.8 | 20.0 | 9.8 | 0.83 | 400 | 0.83 | 60.2 | 1.08 |
| P0A24 | 41.0 | 20.0 | 9.6 | 0.82 | 345 | 0.72 | 64.4 | 1.15 |
| P0A25 | 48.9 | 20.0 | 8.2 | 0.69 | 230 | 0.48 | 66.2 | 1.19 |

TABLE 2-continued

Mechanical properties of LDPE/TPS blends (ribbons) in the machine direction.

| Material | TPS (%) | Glycerol in slurry (%) | $\sigma_{max}$ (MPa) | $\sigma_{max}/\sigma_{max0}$ | $\epsilon_b$ (%) | $\epsilon_b/\epsilon_{b0}$ | E (MPa) | $E/E_0$ |
|---|---|---|---|---|---|---|---|---|
| b). LDPE2049 MFI = 20.0 g/10 min. | | | | | | | | |
| PE2049 | 0.0  | 0.0  | 10.5 | 1.00 | 493 | 1.00 | 58.6 | 1.00 |
| P9A3   | 32.1 | 32.0 | 8.9  | 0.85 | 492 | 1.00 | 41.5 | 0.71 |
| P9A4   | 34.9 | 32.0 | 9.0  | 0.86 | 403 | 0.82 | 41.6 | 0.71 |
| P9A5   | 40.8 | 32.0 | 9.4  | 0.89 | 407 | 0.82 | 36.2 | 0.62 |
| P9A13  | 33.7 | 27.5 | 9.0  | 0.86 | 480 | 0.97 | 40.5 | 0.69 |
| P9A14  | 36.9 | 27.5 | 8.1  | 0.76 | 429 | 0.87 | 43.4 | 0.74 |
| P9A15  | 38.2 | 27.5 | 9.2  | 0.88 | 430 | 0.87 | 41.9 | 0.71 |
| P9A23  | 28.6 | 20.0 | 6.3  | 0.60 | 89  | 0.18 | 68.7 | 1.17 |
| P9A24  | 33.0 | 20.0 | 5.9  | 0.56 | 34  | 0.07 | 75.4 | 1.29 |
| P9A25  | 46.3 | 20.0 | 6.1  | 0.58 | 65  | 0.13 | 71.8 | 1.23 |

TABLE 3

Mechanical properties of LDPE/TPS blends (micro-tensile specimens) in the cross direction

| Material | TPS (%) | Glycerol in slurry (%) | $F_{max}$ (MPa) | $F_{max}/F_{max0}$ | $\epsilon_b$ (%) | $\epsilon_b/\epsilon_{b0}$ | E (MPa) | $E/E_0$ |
|---|---|---|---|---|---|---|---|---|
| a). Conditioned at 0% relative humidity and room temperature. | | | | | | | | |
| PE2040 | 0.0  | 0.0  | 26.5 | 1.00 | 220 | 1.00 | 43.3 | 1.00 |
| P0A13  | 29.0 | 27.5 | 21.1 | 0.80 | 85  | 0.38 | 36.0 | 0.83 |
| P0A14  | 35.5 | 27.5 | 19.1 | 0.72 | 62  | 0.28 | 35.0 | 0.81 |
| P0A15  | 44.7 | 27.5 | 15.7 | 0.59 | 43  | 0.19 | 25.3 | 0.58 |
| P0A16  | 53.3 | 27.5 | 13.8 | 0.52 | 33  | 0.15 | 24.5 | 0.57 |
| P0A23  | 29.8 | 20.0 | 23.5 | 0.89 | 163 | 0.73 | 42.7 | 0.99 |
| P0A24  | 41.0 | 20.0 | 22.6 | 0.85 | 84  | 0.38 | 40.7 | 0.94 |
| P0A25  | 48.9 | 20.0 | 20.3 | 0.77 | 41  | 0.19 | 43.8 | 1.01 |
| b). Conditioned at 50% relative humidity and room temperature. | | | | | | | | |
| PE2040 | 0.0  | 0.0  | 25.9 | 1.00 | 328 | 1.00 | 44.1 | 1.00 |
| P0A13  | 29.0 | 27.5 | 19.6 | 0.76 | 90  | 0.27 | 31.3 | 0.71 |
| P0A14  | 35.5 | 27.5 | 18.1 | 0.70 | 71  | 0.22 | 27.0 | 0.61 |
| P0A15  | 44.7 | 27.5 | 12.8 | 0.49 | 49  | 0.15 | 18.1 | 0.41 |
| P0A16  | 53.3 | 27.5 | 9.3  | 0.36 | 39  | 0.12 | 14.0 | 0.32 |
| P0A23  | 29.8 | 20.0 | 24.0 | 0.93 | 454 | 1.38 | 33.8 | 0.77 |
| P0A24  | 41.0 | 20.0 | 20.7 | 0.80 | 256 | 0.78 | 30.8 | 0.70 |
| P0A25  | 48.9 | 20.0 | 18.2 | 0.70 | 205 | 0.62 | 24.5 | 0.55 |

We claim:

1. A composition of matter comprising a co-continuous blend of thermoplastic starch and synthetic polymer, wherein the co-continuous blend comprises a mixture of a thermoplastic starch phase and a synthetic polymer phase, and wherein both thermoplastic starch and synthetic polymer phases, when considered separately, are essentially constituted of a network of interconnected domains of thermoplastic starch and synthetic polymer, respectively, and wherein said composition is substantially water free.

2. A composition of matter comprising a dispersed phase of thermoplastic starch present in fiber-like strands in a primary phase of synthetic polymer, wherein said dispersed phase of thermoplastic starch is highly continuous in that it is constituted a phase of nearly all interconnected domains of thermoplastic starch such that at least 50% wt of the thermoplastic starch is accessible to extraction using an appropriate solvent in which the thermoplastic starch is soluble, and wherein said composition is substantially water free.

3. The composition of claim 2 wherein thermoplastic starch (TPS) is present in a proportion of at least 20% by weight.

4. The composition of claim 2 wherein said thermoplastic starch is present in a proportion of about 20 to about 80 wt %.

5. The composition of claim 4 wherein said thermoplastic starch is present in a proportion of about 40 to about 60 wt %.

6. The composition of claim 2 wherein said thermoplastic starch comprises about 5 to about 50 wt % of a plasticizer.

7. The composition of claim 6 wherein said plasticizer is glycerol.

8. The composition of claim 2 wherein said synthetic polymer is polyethylene.

9. The composition of claim 3 wherein said synthetic polymer is polyethylene.

10. The composition of claim 4 wherein said synthetic polymer is polyethylene.

11. The composition of claim 5 wherein said synthetic polymer is polyethylene.

12. The composition of claim 6 wherein said synthetic polymer is polyethylene.

13. The composition of claim 7 wherein said synthetic polymer is polyethylene.

14. The composition of claim 1 wherein said thermoplastic starch is present in a proportion of about 20 to 80 wt %.

15. The composition of claim 14 wherein said thermoplastic starch is present in a proportion of about 40 to about 60 wt %.

16. The composition of claim 1 wherein said thermoplastic starch comprises about 5 to about 50 wt % of a plasticizer.

17. The composition of claim 16 wherein said thermoplastic starch comprises about 10 to about 35 wt % of a plasticizer.

18. The composition of claim 17 wherein the plasticizer is glycerol.

19. The composition of claim 1, wherein said synthetic polymer is polyethylene.

20. The composition of claim 19, wherein said thermoplastic starch is thermoplastic wheat starch.

* * * * *